(12) United States Patent
Gangam et al.

(10) Patent No.: US 8,983,536 B2
(45) Date of Patent: Mar. 17, 2015

(54) RESOURCE MANAGEMENT IN A MULTI-OPERATING ENVIRONMENT

(75) Inventors: Vamshika R Gangam, San Jose, CA (US); Joshua D Galicia, Cary, IL (US); Su-Yin Gan, Santa Clara, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 500 days.

(21) Appl. No.: 13/052,514

(22) Filed: Mar. 21, 2011

(65) Prior Publication Data

US 2012/0102495 A1   Apr. 26, 2012

Related U.S. Application Data (60) Provisional application No. 61/405,894, filed on Oct. 22, 2010.

(51) Int. Cl.
| | | |
|---|---|---|
| *H04M 1/00* | (2006.01) | |
| *G06F 9/48* | (2006.01) | |
| *G06F 9/50* | (2006.01) | |
| G06F 11/30 | (2006.01) | |
| G06F 11/32 | (2006.01) | |

(52) U.S. Cl.
CPC ............ *G06F 9/485* (2013.01); *G06F 9/5022* (2013.01); *G06F 11/3037* (2013.01); *G06F 11/32* (2013.01)
USPC .................................................... 455/556.1

(58) Field of Classification Search
USPC .......... 455/552.1, 556.1, 556.2, 566; 709/226
See application file for complete search history.

(56) References Cited

U.S. PATENT DOCUMENTS

| | | | |
|---|---|---|---|
| 8,352,733 B2 * | 1/2013 | Mantere et al. ................ 713/164 |
| 2010/0211769 A1 | 8/2010 | Shankar et al. | |
| 2011/0016299 A1 | 1/2011 | Galicia et al. | |
| 2011/0016301 A1 | 1/2011 | Galicia et al. | |
| 2012/0083264 A1* | 4/2012 | Ramasamy et al. .......... 455/425 |
| 2013/0212283 A1* | 8/2013 | Wang et al. ................... 709/226 |

FOREIGN PATENT DOCUMENTS

| | | |
|---|---|---|
| EP | 1467282 A2 | 10/2004 |
| WO | 2009112896 A2 | 9/2009 |
| WO | 2009120598 A1 | 10/2009 |

OTHER PUBLICATIONS

Darcey, Lauren et al.: "Introducing Android", Aug. 10, 2009, Retrieved from Internet: Retrieved from the Internet: URL:http://media.techtarget.com/searchMobileComputing/downloads/Introducing Android.pdf, on Mar. 26, 2012, pp. 1-29.

(Continued)

*Primary Examiner* — Nguyen Vo
(74) *Attorney, Agent, or Firm* — Morris & Kamlay LLP (57) ABSTRACT

A method for providing user access to telephony operations in a multi operating environment having memory resources nearly depleted that include determining whether a predetermined first memory threshold of a computing environment has been reached and displaying a user interface corresponding to memory usage; and determining whether a predetermined second memory threshold, greater than the first, of the computing environment has been reached. Restricting computing functionality and allowing user access for telephony operations, corresponding to a mobile device, when the second memory threshold is reached is included as well. Also included is maintaining the computing restriction until the memory usage returns below the second memory threshold.

6 Claims, 7 Drawing Sheets

(56) References Cited

OTHER PUBLICATIONS

Zupeng: "MemoryUp Pro User Manual—Mobile RAM Booster for Android", Apr. 29, 2009, Retrieved from the Internet: URL:http://www.emobistudio.com/download/memoryup android/MemoryUp%20Pro%20(Android%20Edition)%20User%20Guide.pdf, retrieved on Mar. 26, 2012.

Patent Cooperation Treaty, International Search Report and Written Opinion of the International Searching Authority for International Application No. PCT/US2011/051904, Apr. 4, 2012, 20 pages.

U.S. Appl. No. 12/839,069, filed Jul. 19, 2010, to Joshua D. Galicia, Jeffrey C. Carlyle and Andrew N. Tzakis, titled System and Method for Switching Between Environments in a Multi-Environment Operating System, all pages.

U.S. Appl. No. 12/838,984, filed Jul. 19, 2010, to Joshua D. Galicia, Jeffrey C. Carlyle and Andrew N. Tzakis, titled Multi-Environment Operating System, all pages.

U.S. Appl. No. 12/839,193, filed Jul. 19, 2010, to Joshua D. Galicia, Jeffrey C. Carlyle, Andrew N. Tzakis and Nicholas C. Hopman, titled Multi-Environment Operating System, all pages.

* cited by examiner

RESOURCE MANAGEMENT IN A MULTI-OPERATING ENVIRONMENT

This is a nonprovisional application claiming the benefit of provisional application, 61/405,894, filed Oct. 22, 2010 under 35 U.S.C. 119(e), whose contents are incorporated by reference herein in their entirety.

FIELD OF THE INVENTION

The present invention relates generally to sharing resources in multi-operating environments. More specifically, the present invention relates to monitoring and managing shared memory resources within a multi-operating environment that includes a mobile communication device.

BACKGROUND

New operational challenges arise when creating multi-operational environment devices (e.g. hardware devices that can include mobile and computing environments on a single device) including: (i) using the memory resources as efficiently as possible in all modes of operation; (ii) maintaining mobile communication or telephony stability and critical functionality while also using the computing environment.

Communication device operating instability can be seen in a multi-operating environment where resources such as memory are shared across the operating environments. Hardware devices can be docked or tethered or exist as peripheral devices during communication or operation within their respective operating environment.

Emulation systems that allow one operating system to control the devices have been thought of as managing resources efficiently. However, other resources such as processor usage are not efficiently handled.

More importantly is controlling the multi-operating environment under critical conditions such as extremely depleted memory resources.

DETAILED DESCRIPTION

Many consumers have experienced instable computing environments and have grown accustomed to dealing with "bugs" in their operating systems. In stark contrast, mobile communication environments are expected to be more robust than typical computing environments, because of the important function of communication on a as needed basis, for example in emergency situations or to give a person's whereabouts to concerned persons. Therefore, there is a challenging opportunity when a mobile communication operating environment is combined with a computing environment on a single platform or kernel. The following discussion describes a way to ensure that devices with these combined capabilities (e.g., mobile tablets/mobile telephones and desktop/laptop computing) remain at least as reliable as the typical mobile telephone.

While the specification concludes with claims defining features of the invention that are regarded as novel and unobvious, it is believed that the invention is better understood from a consideration of the description in conjunction with the drawings. As required, detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as basis for the claims and as a representative basis for teaching one skilled in the art to variously employ the present invention in virtually any appropriately detailed structure. Further, the terms and phrases used herein are not intended to be limiting, but rather to provide an understandable description of the invention.

Figure 1:
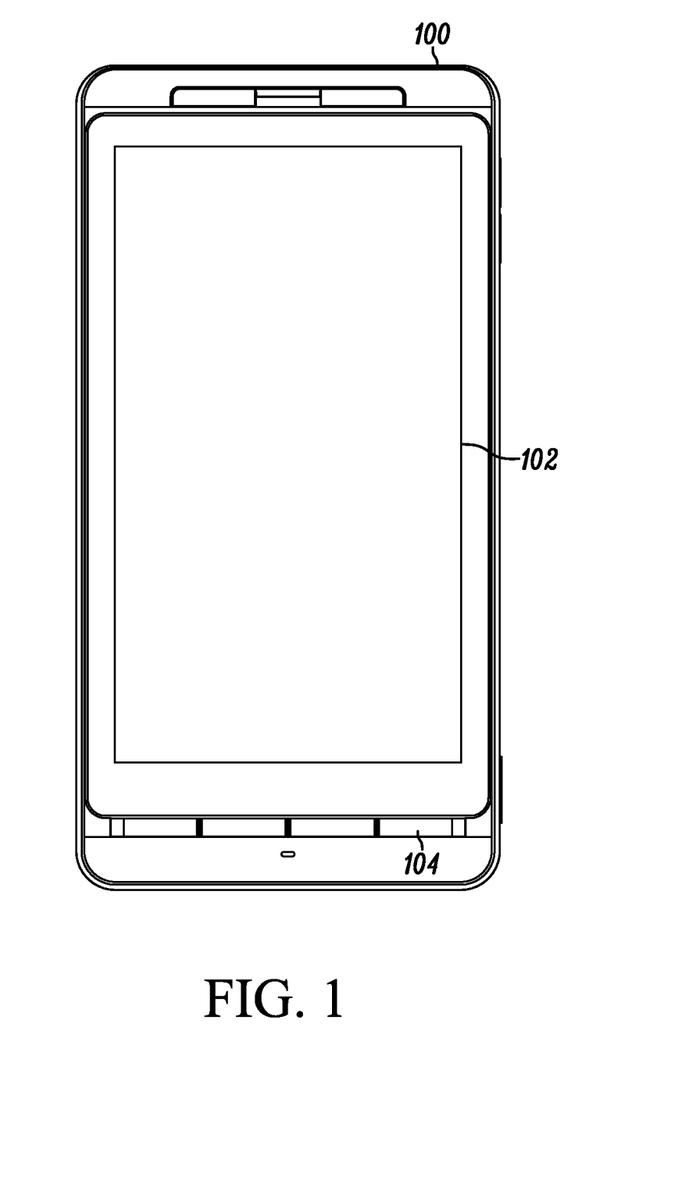
FIG. 1 is an exemplary perspective view of a mobile communication device.

Referring to FIG. 1, an exemplary mobile communication device 100, such as a mobile telephone is provided. A front view of mobile communication device 100 is shown in FIG. 1. Mobile device 100 includes an integrated touch panel 102, wherein the integrated touch panel 102 comprises a capacitive touch sensor and an electrophoretic display (EPD). Additionally, physical operational buttons 104 may be included on the mobile communication device.

Figure 2:
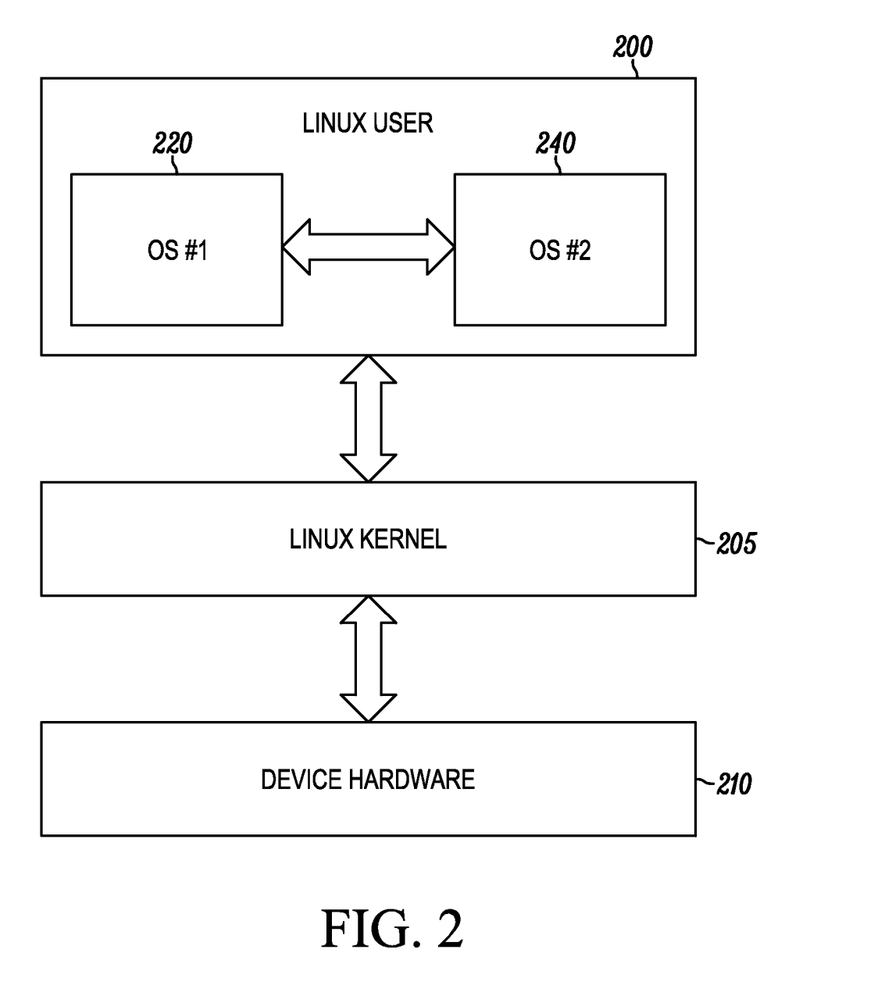
FIG. 2 is a block diagram representing an exemplary multi-operating environment.

Referring to FIG. 2, a block diagram is shown of an exemplary multi-operating environment 200 in communication with a solitary Linux kernel 205. The multi-operating environment can include a Linux distribution system, a Linux-based operating system or a non-Linux-based operating system. Device hardware 210, such as mobile telephones, mobile tablets, mobile communication devices, is also in communication with the Linux kernel 205. The multi-operating environment 200 includes a first middleware operating environment 220 and a second middleware operating environment 240 in communication with a single Linux kernel 205. By example, the second middleware operating system environment 240 is a standard Linux distribution (i.e., a computing operating environment) and the first middleware operating system environment 220 is an embedded operating environment intended for use in mobile devices, such as an Android™ operating system. (Open handsetlliance, www.openhandsetalliance.com)

In one embodiment, a Linux distribution operating system 200 is in communication with the Linux kernel 205, which is in communication with the device hardware 210. The device hardware 210 can be a memory storage device (not shown) coupled to a processor (not shown) which stores computer executable instructions which are configured to perform various functions and operations, as described herein.

An exemplary operating system 200 includes Ubuntu® (Canonical Ltd., www.ubuntu.com) for the Linux-based middleware operating environment 240. It is specifically intended that multiple middleware operating system environments co-exist independent of the other(s). Exemplary environments that can be included in multi-operating environment 200 include Android™, Ubuntu® (Canonical Ltd., www.ubuntu.com), standard Linux-based environments, Symbian (Symbian Foundation Ltd., www.symbian.com), and Windows-based environments. In an alternative embodiment, it is envisioned that greater than two operating environments are configured to independently co-exist on the same core kernel 205. However, kernel 205 may be partioned as well.

Figure 3:
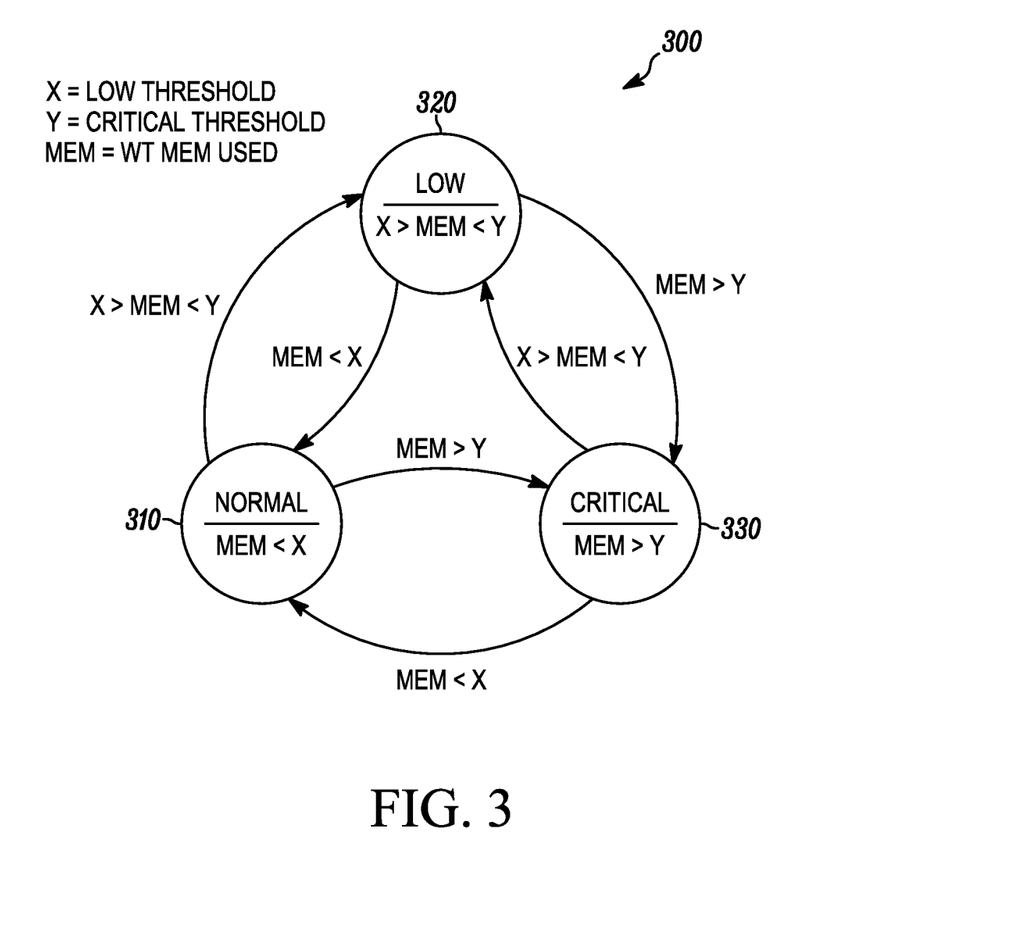
FIG. 3 is a bubble diagram identifying memory threshold decisions and functionality in an exemplary multi-operating environment.

Referring to FIG. 3, a bubble diagram 300 is shown that identifies memory threshold decisions and functionality in an exemplary multi-operating environment. Memory threshold is determined by realizing the amount of memory necessary to retain stability and functionality for a mobile communication device to operate reliably as though it was operating in a conventional stand-alone real time communication operating environment. Specifically, variable "x" is designated as low memory threshold and variable "y' is designated as critical memory threshold. Variable "mem" is designated as the computing environment memory that is currently being used. At initialization or start, the memory usage of the computing environment, such as Linux-based middleware operating environment 240 in FIG. 2 is below a low threshold and thus is considered to be within normal operating range at bubble 310 (i.e., mem<x). However, the usage of several applications at once can lead to increased memory usage that will approach bubble 320 (i.e., x>mem<y). When the memory usage crosses the low memory threshold associated with bubble 320 a warning on a graphical user interface for the computing environment (not shown) is displayed for the user. However, full computing functionality within the computing environment is still possible and accessible by the user.

As the user continues to draw upon memory resources by using additional applications and web browsers or web pages, for example, the memory usage will track towards critical at bubble 330 (i.e., mem>y). At this juncture, a warning on the graphical user interface for the computing environment is displayed and computing functionality is disabled while at the same time there remains limited telephony operational functionality within the mobile communicating operating environment (e.g., Android™ as a first middleware operating system environment 220 in FIG. 2). The limited telephony operational functionality can include text, inbound calls, outbound calls, notifications, and images.

The disabling of computing functionality in the computing environment can include restricting full web browser access or alternatively restricting partial web browser access by enabling selection of certain web pages to close. Moreover, the disabling of computing functionality will nevertheless allow the user to close windows or applications until at least the memory usage is once again below the low memory threshold (x). This exception to the disabled computing functionality can be accomplished by using a pop-up window, for example, that allows the user to exit applications and web browser tabs in order to free memory (i.e., gain additional unused memory), and also keep critical telephony functions.

With regard to what the user sees in the computing environment as computing functionality is disabled, one or more selectable icons are disabled or in the alternative an entire webpage can be "grayed-out". That is the webpage will have no functionality for the user when it is grayed out.

Figure 4A:
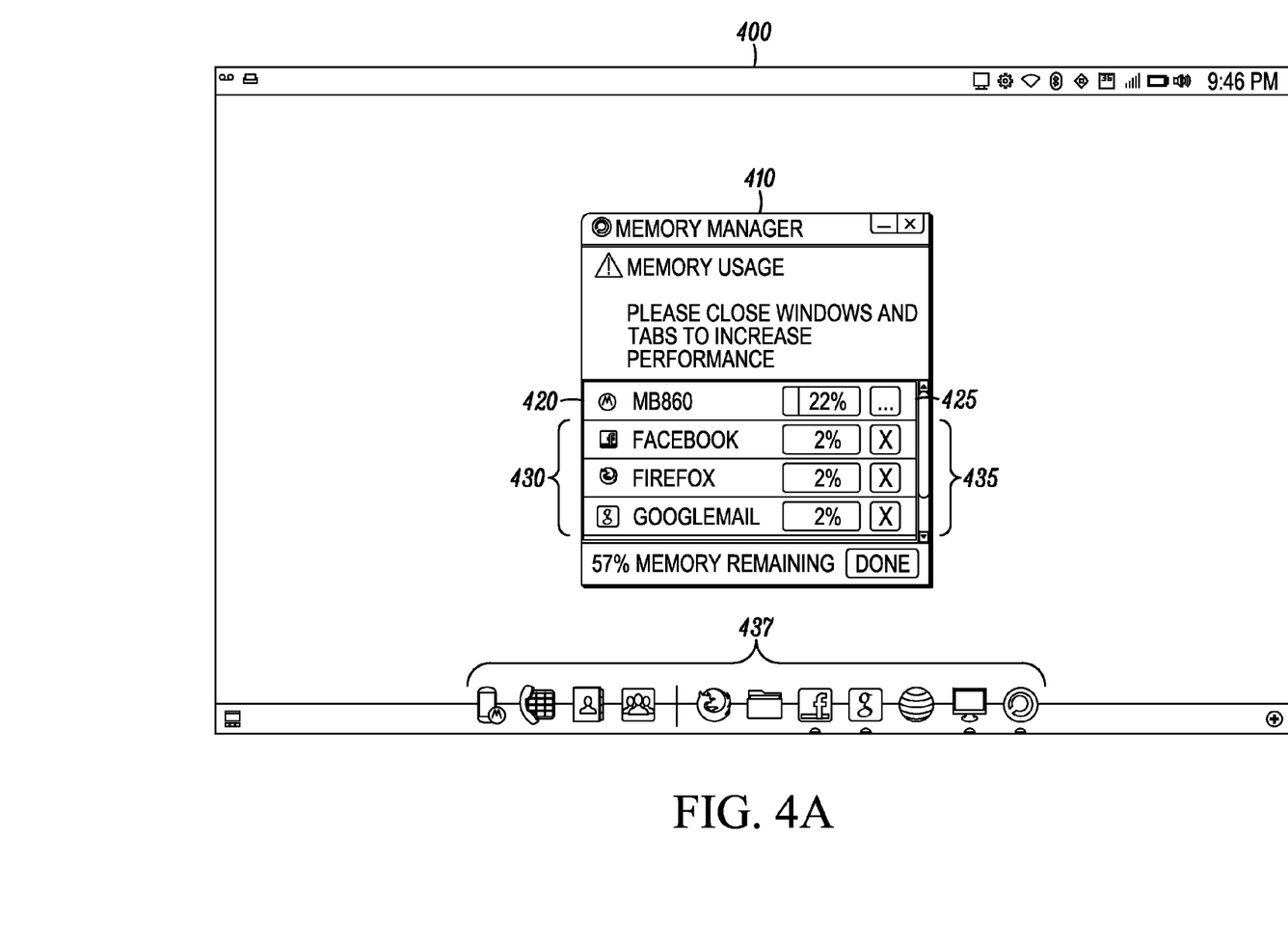
FIG. 4A shows an exemplary webscreen for a memory manager in one state.

Referring to FIG. 4A, an exemplary webscreen 400 is shown in normal state that includes a memory manager 410 under operation by a controller (not shown). Memory usage for the mobile communicating operating environment is displayed as entry 420. A selectable button or icon 425 is associated with the task manager for the mobile communicating operating environment. Other webscreens or windows that are currently open in webscreen 400 are entries 430. The entries 430 can include social networking webpages, web browsers, photo gallery websites, video replay websites, sporting websites, and email entities, for example. Selectable buttons or icons 425 enable a user to close these open webscreens or windows 435 that are displayed as entries 430. Selectable widgets 437 can also include social networking webpages, web browsers, photo gallery websites, video replay websites, sporting websites, and email entities, for example; along with telephony functions as well.

Figure 4B:
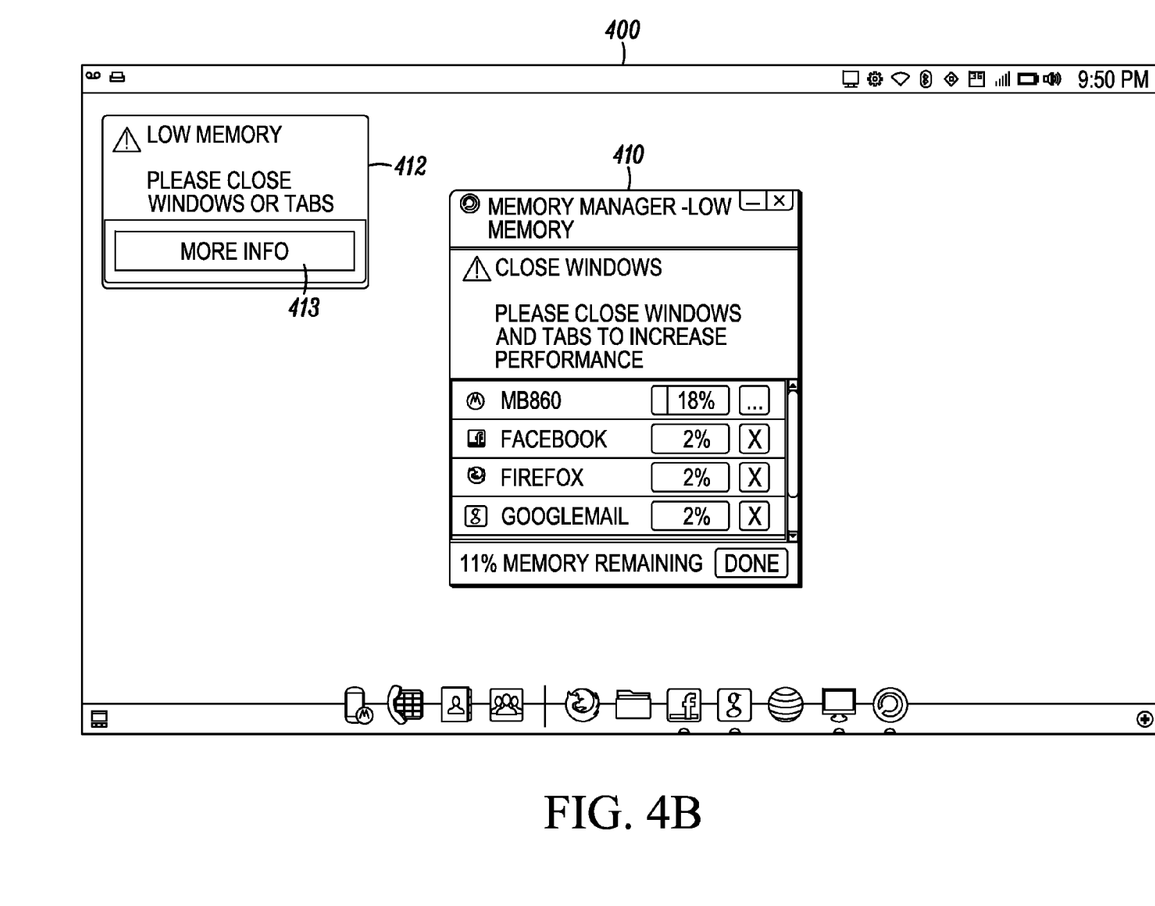
FIG. 4B shows an exemplary webscreen for a memory manager in another state.

Referring to FIG. 4B, memory manager 410 illustrates an exemplary low memory threshold condition as low memory notification 412. Low memory notification 412 remains on webscreen 400 until the low memory warning condition ceases. A "More Info" button or icon 413 can open a memory manager application that is in the warning mode.

Figure 4C:
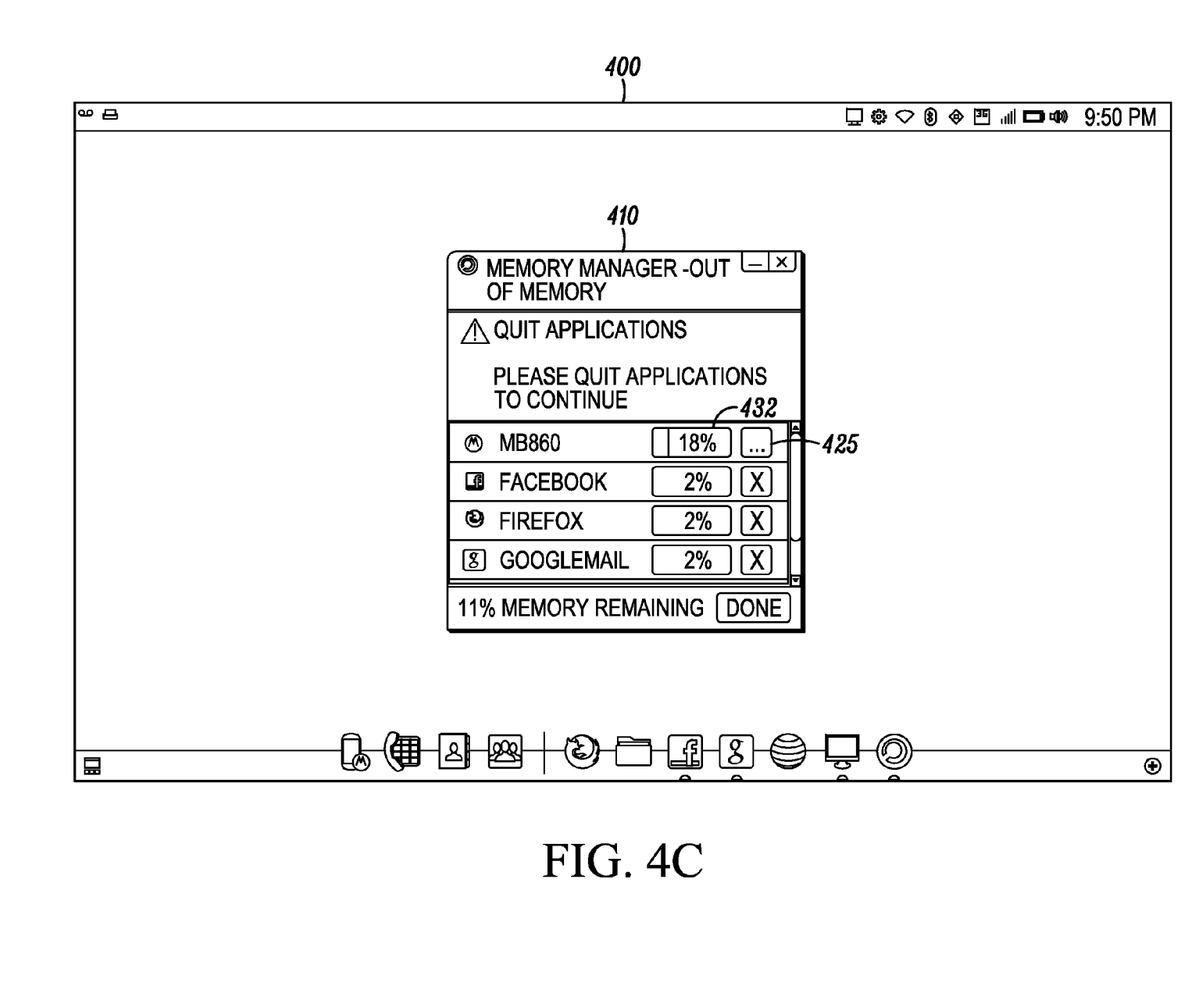
FIG. 4C shows an exemplary webscreen for a memory manager in yet another state.

Referring to FIG. 4C, memory manager 410 illustrates an exemplary critical memory threshold condition (i.e., where memory usage is nearly or substantially depleted). Webscreen 400 is "grayed out", thus only allowing a user to close memory draining entries 432 within the computing operating environment via buttons or icons 425. In addition, memory manager 410 restricts usage of the mouse or pointer and the keyboard for entering text. Thus, memory manager 410 prevents the user from doing anything other than closing open windows or applications in the computing environment. The only exception to this user restriction is when there is an urgent notification like an incoming call, alarm, or message, for example or when webscreen 400 is locked.

Figure 4D:
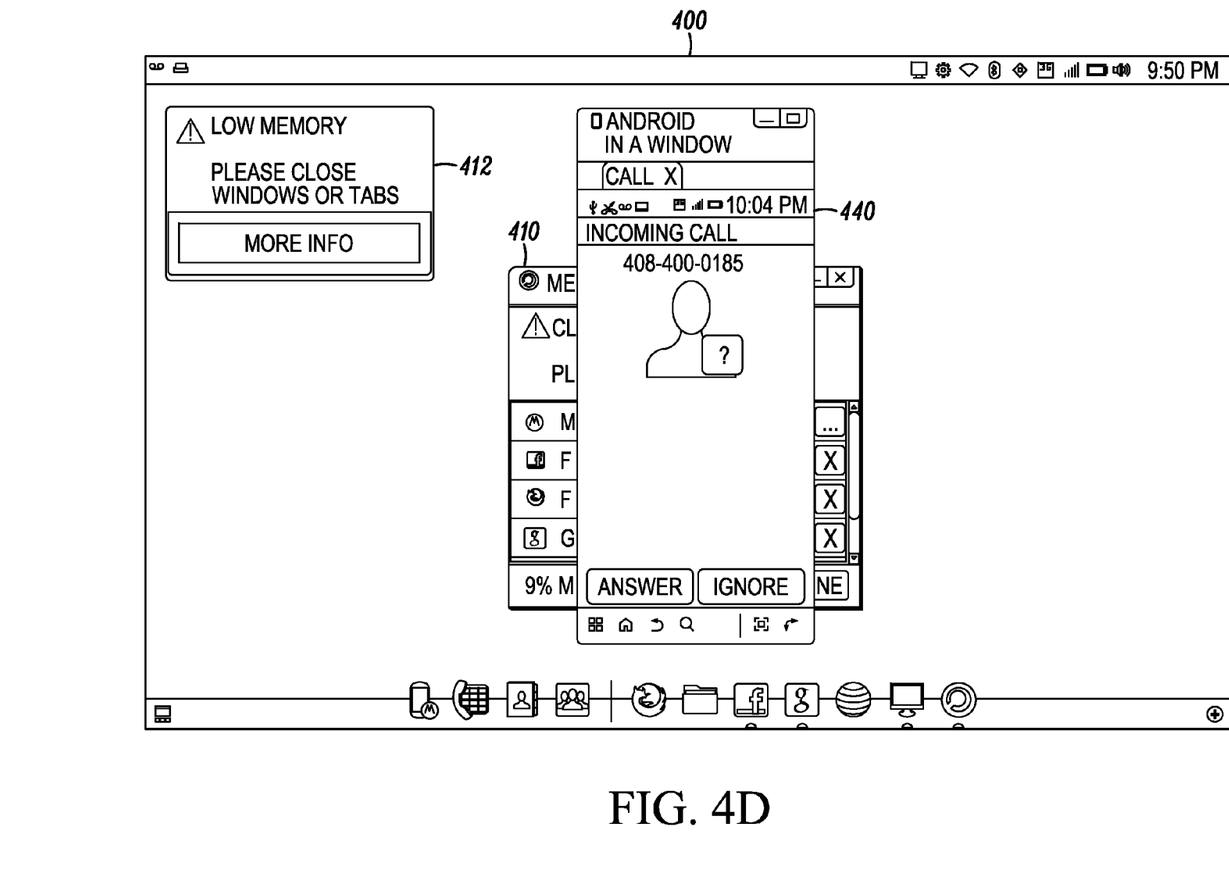
FIG. 4D shows an exemplary webscreen for a memory manager in same state as in FIG. 4C along with an exemplary notification.

Referring to FIG. 4D, memory manager 410 illustrates an exemplary critical memory threshold condition 412 (i.e., where memory usage is nearly or substantially depleted) and an urgent mobile communication notification window 440 (e.g., an incoming call, text, or image) within the mobile communication operating environment. During this juncture the computing functionality is severely or substantially limited; for example, automatic or manual selection for access or usage of memory draining web browser or specific tabs, select web pages, or windows within the memory draining web browser. However, the user may use either a mouse or keyboard to answer the phone call that is displayed in mobile communication notification window 440. Thereafter, once the call ends, memory manager 410 will further restrict computing functionality until the memory usage returns to below the critical memory threshold (y) as shown in FIG. 3.

Notably, the memory resources of the mobile communication device, i.e., mobile telephone or mobile tablet can also be tracked via a graphical user interface as shown in FIGS. 4A-4D. The user can select a button or icon to display the ongoing memory usage associated primarily with the mobile communication device.

This invention makes a mobile phone that is functioning in a multi-operating environment more stable and more reliable by preventing the user from opening additional windows or starting new applications when memory resources are critically low. This in turn, will help in making sure that the multi-operating environment doesn't crash or fail due to the lack of memory and the invention will also help in preventing missed calls that could inevitably arise in the event of system crash.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus, such as a controller, can be adapted for carrying out the methods described herein. A combination of hardware and software within a processing system can include an application that when loaded and executed controls the processing system such that it carries out the methods described herein.

The present invention also can be embedded in an application product, which comprises all the features enabling implementation of the methods described herein, and which when loaded in a processing system is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, on object implementation, an executable application, an applet, a servlet, a source code, an object code, a shared library/dynamic load library and/or other sequence of instructions designed for execution on a processing system.

The terms "a" and "an" as used herein, are defined as one or more than one. The term "plurality" as used herein, is defined as two as or more than two. The term "another" as used herein, is defined as at least a second or more. The terms "including" and/or "having" as used herein, are defined as comprising (i.e., open language).

It is specifically intended that the present invention not be limited to the embodiments and illustrations contained herein, but include modified forms of those embodiments including portions of the embodiments and combinations of elements of different embodiments as come within the scope of the following claims.

We claim:

1. A method for a communication device including first and second independent operating systems on a common kernel, the first operating system providing telephony operations and the second operating system providing a computing environment, the communication device further including a memory manager, the method comprising:

determining, by the memory manager, that a predetermined first memory threshold of the computing environment has been reached;

in response to determining that the first threshold is reached, displaying, on a user interface of the communication device, memory information when the first threshold has been reached;

determining, by the memory manager, that a predetermined second memory threshold of the computing environment has been reached, the second threshold greater than the first threshold;

in response to determining that the second threshold is reached, the memory manager restricting computing functionality of the second operating system and keeping memory available for telephony operations provided by the first operating system; and maintaining the computing functionality restriction of the second operating system until the memory usage of the communication device falls below the second memory threshold.

2. The method according to claim 1, wherein the second memory threshold is a critical memory threshold, the communication device generating a memory usage warning while impacting functionality in the computing environment in order to retain telephony operations.

3. The method according to claim 2, wherein the computing functionality impacted includes restricted web browser access.

4. The method according to claim 2, wherein the computing functionality impacted includes restricting web browser access to select web pages.

5. The method according to claim 4, wherein the select web pages are tabbed web pages.

6. The method according to claim 1, wherein the memory is made available for telephony operations including inbound and outbound calling.

* * * * *